(12) United States Patent
Achkir

(10) Patent No.: US 11,038,948 B2
(45) Date of Patent: Jun. 15, 2021

(54) REAL TIME UPDATES AND PREDICTIVE FUNCTIONALITY IN BLOCK CHAIN

(71) Applicant: Cisco Technology, Inc., San Jose, CA (US)

(72) Inventor: D. Brice Achkir, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 281 days.

(21) Appl. No.: 15/988,576

(22) Filed: May 24, 2018

(65) Prior Publication Data

US 2019/0362287 A1 Nov. 28, 2019

(51) Int. Cl.
*H04L 29/08* (2006.01)
*G06Q 10/06* (2012.01)
(Continued)

(52) U.S. Cl.
CPC .......... *H04L 67/10* (2013.01); *G06F 21/6209* (2013.01); *G06Q 10/06315* (2013.01); *G06Q 10/06316* (2013.01); *G06Q 10/08* (2013.01); *G06Q 20/308* (2020.05); *G06Q 20/389* (2013.01); *G06Q 20/3829* (2013.01); *G06Q 30/0633* (2013.01); *G06Q 50/04* (2013.01);
(Continued)

(58) Field of Classification Search
None
See application file for complete search history.

(56) References Cited

U.S. PATENT DOCUMENTS 5,608,620 A * 3/1997 Lundgren ........ G06Q 10/06398
705/1.1
5,953,707 A * 9/1999 Huang .................. G06Q 10/06
705/7.25
(Continued)

FOREIGN PATENT DOCUMENTS

WO 2018006056 A1 1/2018

OTHER PUBLICATIONS

V. Bracamonte and H. Okada, "The issue of user trust in decentralized applications running on blockchain platforms," 2017 IEEE International Symposium on Technology and Society (ISTAS), Sydney, NSW, 2017, pp. 1-4, doi: 10.1109/ISTAS.2017.8318975 (Year: 2017).*

(Continued)

*Primary Examiner* — Gurkanwaljit Singh
(74) *Attorney, Agent, or Firm* — Polsinelli PC

(57) ABSTRACT

Systems, methods, and devices are disclosed for providing real-time updates and predictive functionality in a supply distribution chain of a product. A request is received from a user to view decentralized status information for a product, where the decentralized status information can include real time updates for building the product, assembling the product, shipping the product, and/or exchanging payments between suppliers, partners, or both. This decentralized status information for the product is received from one or more nodes on a distributed network, with the nodes being suppliers and/or partners in the supply distribution chain of the product. The user is granted at least read access to the decentralized status information of the product, as well as a prediction of product build completion based on node supply chain relationships specified within a smart contract.

20 Claims, 8 Drawing Sheets

Timeline

(51) Int. Cl.

| | | |
|---|---|---|
| *G06F 21/62* | (2013.01) | |
| *G06Q 30/06* | (2012.01) | |
| *G06Q 50/04* | (2012.01) | |
| *H04L 9/06* | (2006.01) | |
| *H04L 9/32* | (2006.01) | |
| *H04L 9/30* | (2006.01) | |
| *G06Q 20/38* | (2012.01) | |
| *G06Q 10/08* | (2012.01) | |
| *G06Q 20/30* | (2012.01) | |

(52) U.S. Cl.
CPC .............. *H04L 9/0637* (2013.01); *H04L 9/30* (2013.01); *H04L 9/3247* (2013.01); *G06Q 2220/00* (2013.01); *H04L 2209/38* (2013.01)

(56) References Cited

U.S. PATENT DOCUMENTS

| | | | | |
|---|---|---|---|---|
| 5,963,919 | A * | 10/1999 | Brinkley | G06Q 10/087 705/22 |
| 6,606,615 | B1 * | 8/2003 | Jennings | G06Q 10/06 706/45 |
| 6,658,467 | B1 * | 12/2003 | Rice | G06Q 30/02 709/219 |
| 6,792,399 | B1 * | 9/2004 | Phillips | G06Q 10/06 705/36 R |
| 6,865,542 | B2 * | 3/2005 | Cox | G06Q 10/06315 705/7.31 |
| 7,072,863 | B1 * | 7/2006 | Phillips | G06Q 40/00 703/2 |
| 7,124,101 | B1 * | 10/2006 | Mikurak | G06Q 10/06 705/35 |
| 7,225,153 | B2 * | 5/2007 | Lange | G06Q 40/00 705/35 |
| 7,584,116 | B2 * | 9/2009 | Kakouros | G06Q 30/0202 705/7.31 |
| 7,590,937 | B2 * | 9/2009 | Jacobus | G06Q 40/06 715/700 |
| 7,716,077 | B1 * | 5/2010 | Mikurak | G06Q 10/06 705/7.12 |
| 7,747,339 | B2 * | 6/2010 | Jacobus | G06Q 40/06 700/99 |
| 8,781,882 | B1 * | 7/2014 | Arboletti | G06Q 10/0639 705/7.39 |
| 8,831,228 | B1 * | 9/2014 | Agrawal | H04L 9/0822 380/286 |
| 9,495,652 | B1 * | 11/2016 | Cook | G06Q 10/00 |
| 2002/0072977 | A1 * | 6/2002 | Hoblit | G06Q 20/203 705/22 |
| 2002/0133368 | A1 * | 9/2002 | Strutt | G06Q 30/02 705/7.11 |
| 2002/0138316 | A1 * | 9/2002 | Katz | G06Q 30/0202 705/7.13 |
| 2002/0152111 | A1 * | 10/2002 | Cox | G06Q 10/0637 705/7.31 |
| 2002/0174000 | A1 * | 11/2002 | Katz | G06Q 10/087 705/7.26 |
| 2002/0178077 | A1 * | 11/2002 | Katz | G06Q 10/10 705/7.36 |
| 2004/0064351 | A1 * | 4/2004 | Mikurak | G06Q 10/087 705/22 |
| 2004/0068454 | A1 * | 4/2004 | Jacobus | G06Q 40/06 705/36 R |
| 2004/0068455 | A1 * | 4/2004 | Jacobus | G06Q 10/087 705/36 R |
| 2004/0088211 | A1 * | 5/2004 | Kakouros | G06Q 10/06395 705/7.31 |
| 2006/0178918 | A1 * | 8/2006 | Mikurak | G06Q 10/06375 705/7.25 |
| 2014/0019288 | A1 | 1/2014 | Bossinakis | |
| 2014/0289525 | A1 * | 9/2014 | Agrawal | H04L 9/0822 713/171 |
| 2017/0046806 | A1 | 2/2017 | Haldenby et al. | |
| 2017/0116693 | A1 * | 4/2017 | Rae | H04L 9/3236 |
| 2017/0206523 | A1 * | 7/2017 | Goeringer | G06Q 20/409 |
| 2017/0244721 | A1 * | 8/2017 | Kurian | H04L 63/105 |
| 2018/0012311 | A1 * | 1/2018 | Small | G06Q 30/0185 |
| 2019/0188706 | A1 * | 6/2019 | McCurtis | G06Q 20/02 |
| 2019/0340269 | A1 * | 11/2019 | Biernat | G05B 19/41865 |

OTHER PUBLICATIONS

Jamsrandorj, T. (2017). Decentralized Access Control Using The Blockchain (Doctoral dissertation, University of Saskatchewan) (Year: 2017).*

Zyskind, Guy, Oz Nathan, and Alex Pentland. "Enigma: Decentralized computation platform with guaranteed privacy." arXiv preprint arXiv:1506.03471 (2015). (Year: 2015).*

Mearian, "MERSK, IBM create world's first blockchain-based, electronic shipping platform," Jan. 16, 2018, pp. 1-6.

Garner, "Blockchain Shipping: A New Shipment Protocol," Apr. 2, 2018, pp. 1-7.

* cited by examiner

REAL TIME UPDATES AND PREDICTIVE FUNCTIONALITY IN BLOCK CHAIN

TECHNICAL FIELD

The present disclosure relates generally to providing updates within a supply chain, and more specifically to real time updates and predictive functionality for products within the supply chain.

BACKGROUND

Supply chain networks around business transactions tend to be complex, as the supply chain networks are designed to address a multitude of business activities between disparate partners or suppliers. For example, supply chain network complexities arise due to the need to customize for new needs, implement management rapidly, deal with sensitive data sharing and other security concerns, etc. Moreover, these complexities arise in addition to the supply chain network's high cost associated with recurring licensing fees, extensive resource trainings, and lack of interconnectivity between different systems within the supply chain network.

A typical supply chain network for a large company needs to deal with potentially thousands of nodes of suppliers and partners, the number of which may increase or decrease dynamically as different suppliers or partners are brought in or leave the system. These suppliers and partners are partially managed through disparate in-house systems, human beings, meetings, calls, etc. Communication between different suppliers on the supply chain network are done through direct communication between themselves, such as through business to business messages.

Business to business (B2B) messages are key vehicles to communicate, but they are prone to error. Even if a company acts as a centralizing party by hosting the supply chain network that gets and sends B2B messages to and from all the parties involved, errors can be inadvertently inserted in these point to point transactions through transcription error, or can be lost entirely. For example, a large amount of information exchanged between parties are not documented in any tool or supply chain network service, such as information exchanged during in-person meetings or phone calls. Moreover, even in the absence of error or the failure to input information, parties who engage in many meetings and phone calls find it laborious to add this information to the supply chain network and then determine which other parties should be able to see or access this information. All of these issues can lead to large errors or small errors that, in the aggregate, lead to large workflow issues that are costly, time consuming, or both.

Other issues, such as the visibility of the entire supply chain, are nonexistent, and the final customer for which the product is built is unable to get a good idea of what is happening (such as how the product is being manufactured, who is doing the manufacturing, where it is being shipped from, etc.).

Blockchain systems have been proposed that might solve portions of the above problems, but they are inadequate. While current blockchain implementations can be used to record the custody of a product (or parts of a product) for supply chain purposes, they cannot provide real time updates as the product is shipped across the world. Moreover, current blockchain systems are unable to provide any predictive implementations.

For example, a customer (such as a distributor) may need to plan when to pick up products shipped by one or more suppliers. An inability to pick up the products, for example, could lead to pallets being left outside the customer's building and, if there is bad weather or poor security, product damage. But shipping information can be lost, for example, on flights that deliver the product and when or where the product is expected to get delivered to the customer. Moreover, the inability to determine when the product is delivered prevents payments between parties (e.g., suppliers, distributors, etc.) from being automated in an easy, decentralized way. Accordingly, a more accurate and flexible supply chain system is needed.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

Systems, methods, and devices are disclosed for providing real-time updates and predictive functionality in a supply distribution chain of a product. A request is received from a user to view decentralized status information for a product, where the decentralized status information can include real time updates for building the product, assembling the product, shipping the product, and/or exchanging payments between suppliers, partners, or both. This decentralized status information for the product is received from one or more nodes on a distributed network, with the nodes being suppliers and/or partners in the supply distribution chain of the product. The user is granted at least read access to the decentralized status information of the product, as well as a prediction of product build completion based on node supply chain relationships specified within a smart contract.

EXAMPLE EMBODIMENTS

The disclosed technology provides a supply chain (e.g., an enterprise blockchain system) that not only gives the customer visibility into the supply chain from build to shipment, but also provides real time updates and predictive functionality. Blockchain technology can be used to provide real time data, updates, and predictive functionality in a distributed fashion.

Suppliers and partners are enabled as physical or virtual nodes on a supply distribution chain network (such as a blockchain network), and each node can be subject to a set of rules and policies based on the role they play in the business. The rules and policies are, for example, described and executed through smart contracts. A customer or an end user ordering a product can be granted access to the supply chain network with a set of rules and policies as well. The parties involved in the supply distribution chain of building a product can in some embodiments be assigned tasks to perform, whether the tasks are procuring components needed to build the product, assembling the product, shipping the product, or in making payments between suppliers and partners.

Figure 1:
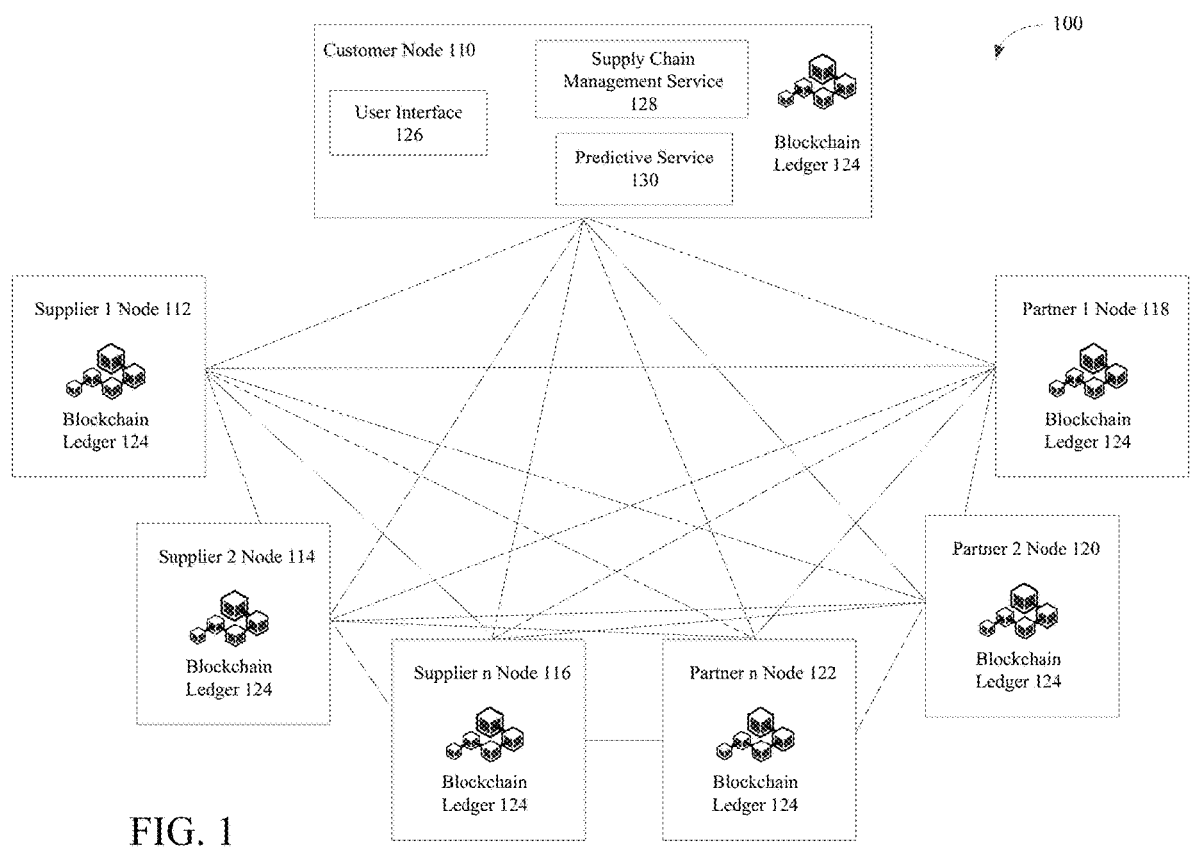
FIG. 1 shows an example schematic diagram of a supply chain network that includes various nodes that are configured to maintain a blockchain in accordance with some embodiments.

FIG. 1 shows an example schematic diagram of a supply distribution chain network that includes various nodes that are configured to maintain a blockchain in accordance with some embodiments. Client node 110 is one of many nodes within the supply distribution chain network, system 100. System 100 can include any number of suppliers (e.g., vendor, plant, etc. involved with component construction, assembly, merging of components, etc.) that have been enabled as nodes on system 100, such as supplier 1 node 112, supplier 2 node 114, . . . to supplier node n 116. System 100 can also include any number of partners as well (e.g., distributors, shippers, retailers, third party logistics providers, etc.), which have also been enabled as nodes: partner 1 node 118, partner 2 node 120 . . . to partner n node 122. Each node on system 100—including all suppliers, partners, and clients—include a copy of blockchain ledger 124 that has been duplicated across all the nodes.

Blockchain ledger 124 is any linked ledger system. In the embodiment shown, blockchain ledger 124 is a ledger system within a distributed blockchain, where a continuously growing list of records, called blocks, are linked to one or more previous blocks. Blocks can be continuously updated as blockchain ledger 124 is modified with subsequent transactions, data, updates, etc. from the nodes within system 100. For example, a block can record that a certain component, such as a transceiver, has been manufactured by supplier 1 node 112, a later block can record that a casing has been manufactured by supplier 2 node 114, and another subsequent block can record that the transceiver has been matched to the casing by supplier n node 116. This record can extend throughout the entire manufacturing and distribution of the associated product, including receipt of materials (e.g., receiving, from an entity, product parts such as the wiring, transceiver parts, laser, etc. of a transceiver) to the end purchase (e.g., information that a pluggable receiver that includes the transceiver and casing was purchased from a distributor or retailer, and by whom).

In the embodiment shown, system 100 can be used and run by one organization or entity, which can manage security and control authorization for each node on the network in addition to managing business rules and policies. For example, the organization may grant a first node access to only a portion of some data on the blockchain, so that information from another node (who may be a competitor of the first node) is kept private from the first node. The organization may even keep some information private from all network nodes. Alternatively, in some embodiments system 100 may be, in part or in whole, a public distributed blockchain. However, one of skill in the art will understand that any architecture that supports a chain of custody of individual components can be used to the same effect.

Each node can include functionality to read and/or access blockchain ledger 124, record transactions, data, updates, etc. A customer may also access blockchain ledger 124 at user interface 126 on customer node 110, subject to certain rules, policies, and restrictions set by supply chain management service 128. For example, a customer may be granted only read access to a portion of the data on blockchain ledger 124 so that sensitive internal business data for, say, supplier 1, is not made public. This is one difference between blockchain ledger 124 and a traditional public blockchain. Any authorized party can write to blockchain ledger 124 of the present technology, but authorized parties can only read data on blockchain ledger 124 to which they have specific access.

Supply chain management service 128 can also manage numerous functions of blockchain ledger 124, such as determining when and how to update blockchain ledger 124, whether to modify or create a block within blockchain ledger 124, initiate and/or customize product ordering within system 100, initiate or execute rules and policies within smart contracts, etc.

System 100 can also include predictive service 130, which can provide a prediction on how long it will take to build the product, how long until the customer can expect the product to be delivered, and prediction adjustments based on component shortages or other delays. Predictive service 130 is discussed in more detail in FIG. 7.

Figure 2:
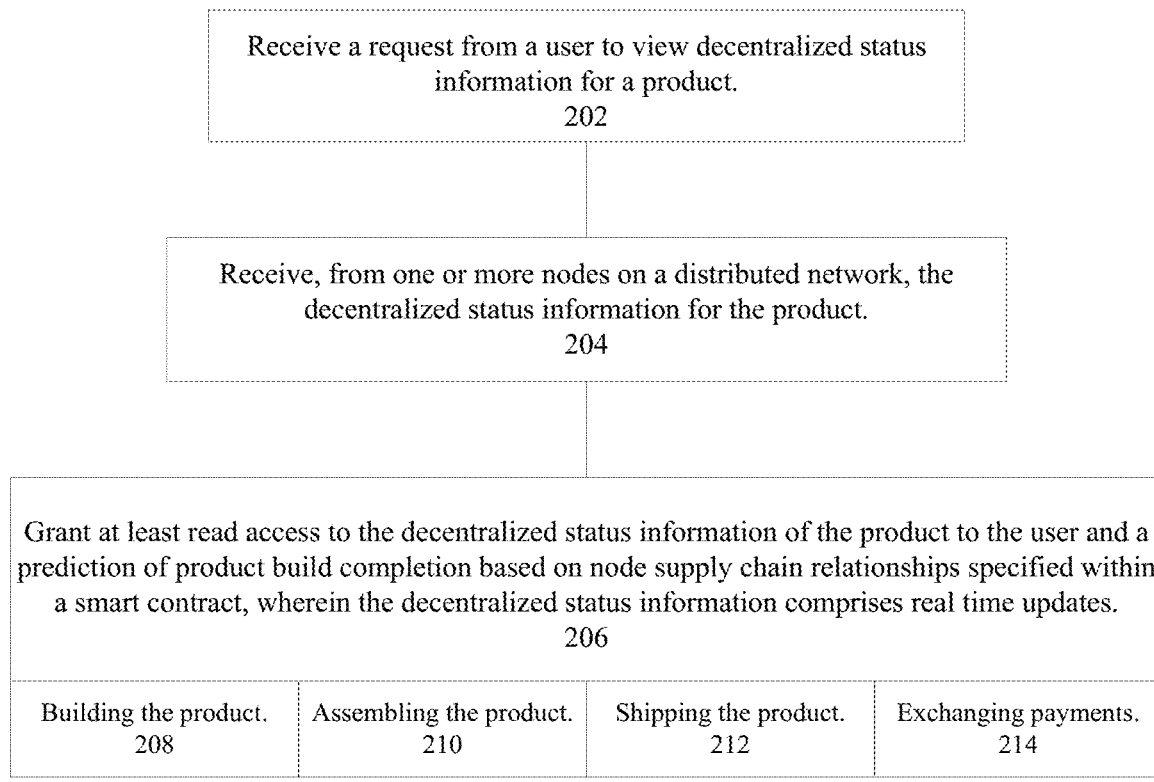
FIG. 2 is a flowchart representation of an example implementation of a supply chain in a blockchain environment in accordance with some embodiments.

FIG. 2 is a flowchart representation of an example implementation of a supply chain in the blockchain environment in accordance with some embodiments. The method begins by receiving a request from a user to view decentralized status information (e.g., the information recorded in blockchain ledger 124 blocks) for a product (step 202). The request can be received, for example, through user interface 126 on customer node 110. The decentralized status information can include any information throughout the entire manufacturing and distribution of the product, including receipt of materials (e.g., receiving, from an entity, product parts such as the wiring, transceiver parts, laser, etc. of a transceiver) to the end purchase (e.g., information that the pluggable receiver was purchased from a distributor or retailer, and by whom). The decentralized status information can also include shipping information and/or updates, such as delays in shipment or transfer between carriers.

The decentralized status information can be received from one or more nodes on the distributed network, such as nodes 110, 112, 114, 116, 118, 120, and 122 that represent client, supplier, and/or partner nodes within the supply chain of the distributed network (step 204). The user can then be granted access to the decentralized status information (step 206), although the access granted to the user can be subject to restrictions. Some of these restrictions can include granting the user read access to only a portion of the decentralized status information of the product to the user, but not access to the entire decentralized status information or no ability to write to blockchain ledger 124. The user can also be provided with a prediction of product build completion based on node supply chain relationships specified within one or more smart contracts.

The decentralized status information can include real time or near real time updates for any number of events associated with building the product (step 208), assembling the product (210), shipping the product (212), or exchanging payments between the one or more of suppliers or partners (214) based on the completion of conditions within contracts (e.g., the completion and shipment of a component from one supplier to another).

Figure 3:
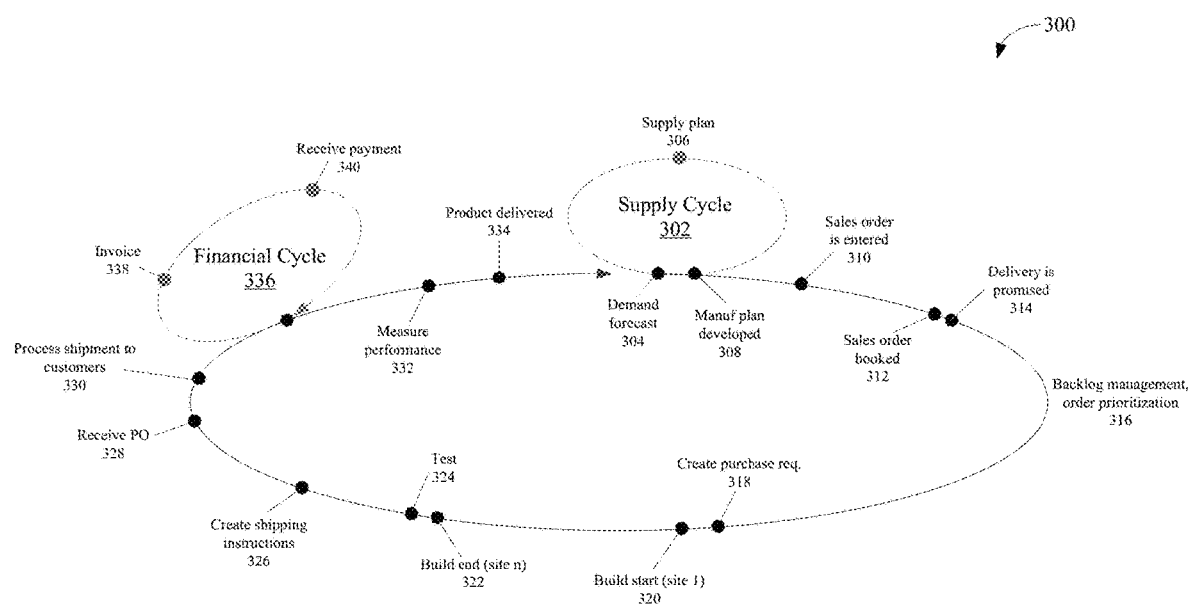
FIG. 3 shows a diagram of an example supply chain process for a product in accordance with some embodiments.

Turning to FIG. 3, an example block diagram of a supply chain process for a product according to various embodiments is shown. This example embodiment illustrates an example supply chain 300 that can be used to process a customer request, from the initial order of the product to the product's final delivery. Many interdependencies are involved to make sure the request can be committed and then placed in queue for execution, with each step in the process depending on information/data from the previous step in the sequential process. For example, a smart contract can specify that a manufacturing plan 308 can only be generated once demand forecast 304 and/or supply plan 306 has been added to the blockchain. Each step can be used as status information that is added to a block within blockchain ledger 124 on the distributed network.

For example, the decentralized status information can include supply cycle 302 information if the product is not in stock or otherwise needs to be built. Supply cycle 302 information can include demand forecast 304 that, depending on the number of similar products ordered or are expected to be ordered, predicts the number of products needed to be built. Demand forecast 304 can predict demand for the product overall (and so determine a total number of products that should be built to satisfy demand), or can be specific demands for each component of the product and each supplier who provides the component in the supply chain. Supply plan 306 can break the product into its component pieces and determine which suppliers are available for producing the component pieces.

A manufacturing plan 308 can be developed based on supply plan 306, as well as information from demand forecast 304 that projects which suppliers will be the fastest and/or lowest cost suppliers available. For example, while supply plan 306 may list 10 suppliers who are available to provide a certain component of the product, demand forecast 304 may determine that all but one of the suppliers are experiencing a shortage of a material used to make the certain component. Thus, the lowest cost supplier will be the supplier who is not currently experiencing the shortage (e.g., the demand is low compared to the other suppliers), and manufacturing plan 308 may then provide or select that lowest cost supplier over other available suppliers. The manufacturing plan 308 can provide or select the particular supplier based on conditions within smart contracts that optimize the price, speed of manufacture, etc. In some embodiments, the customer can modify manufacturing plan 308 to include their suppliers and/or partners of choice.

The decentralized status information can also include steps in the order process itself that can update the customer on the order status, such as the sales order being entered (310), sales order being booked (312), and a promised delivery date (314). The promised delivery date 314 can be based on a determination of how long it will take to execute the manufacturing plan 308, which depends on demand forecasts 304. Since demand forecasts 304 can be updated in real time or near real time, the manufacturing plan 308 can also be updated to reflect demand forecast changes, and that can be passed on to the delivery date 314 as well. Accordingly, the customer can be apprised of changes in delivery date 314 throughout the entire build process, even as there are changes to the ability to manufacture product components based on material shortages.

The decentralized status information can furthermore include updates in the build process itself. For example, the decentralized status information can include updates to order prioritization and/or backlog management (316) as suppliers become available to provide the components, as well as the creation of the purchase request (318) that is distributed to the nodes on the network once the order has progressed through the backlog queue. Events related to what components have been or are being produced can also be included in the decentralized status information, from the start of the build at site 1 (320) to the end of the build at site n (322). The decentralized status information can also include any testing (324) of any components built throughout the build process.

Events related to the shipping process can also be included as decentralized status information. For example, blocks for the ledger can be created for the creation of shipping instructions (326), receiving the purchase order (328), processing the shipment to customers (330) (e.g., determining which airlines or carriers will deliver the product, and on which schedule), the performance of the shipment (332) (e.g., whether there are any delays, such as those due to weather, that will affect the delivery date), and when the product has been delivered (334).

The decentralized status information can also include financial cycles 336 throughout any stage of the supply chain process. For any event that includes multiple suppliers or partners that, upon completion, requires payment between the parties, financial cycle 336 can be executed through smart contracts to provide updates on the blockchain ledger. The updates can be, for example, the creation of an invoice (338) and the receipt of payment (340).

Figure 4:
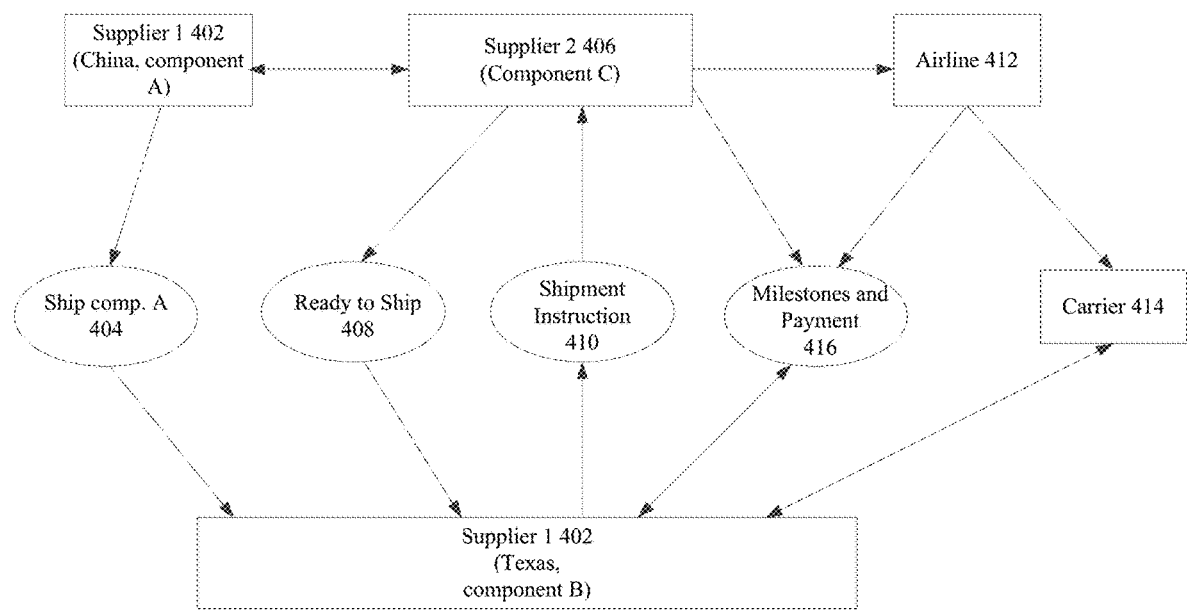
FIG. 4 shows a diagram of an example build and shipping process for a product in accordance with some embodiments.
Figure 5:
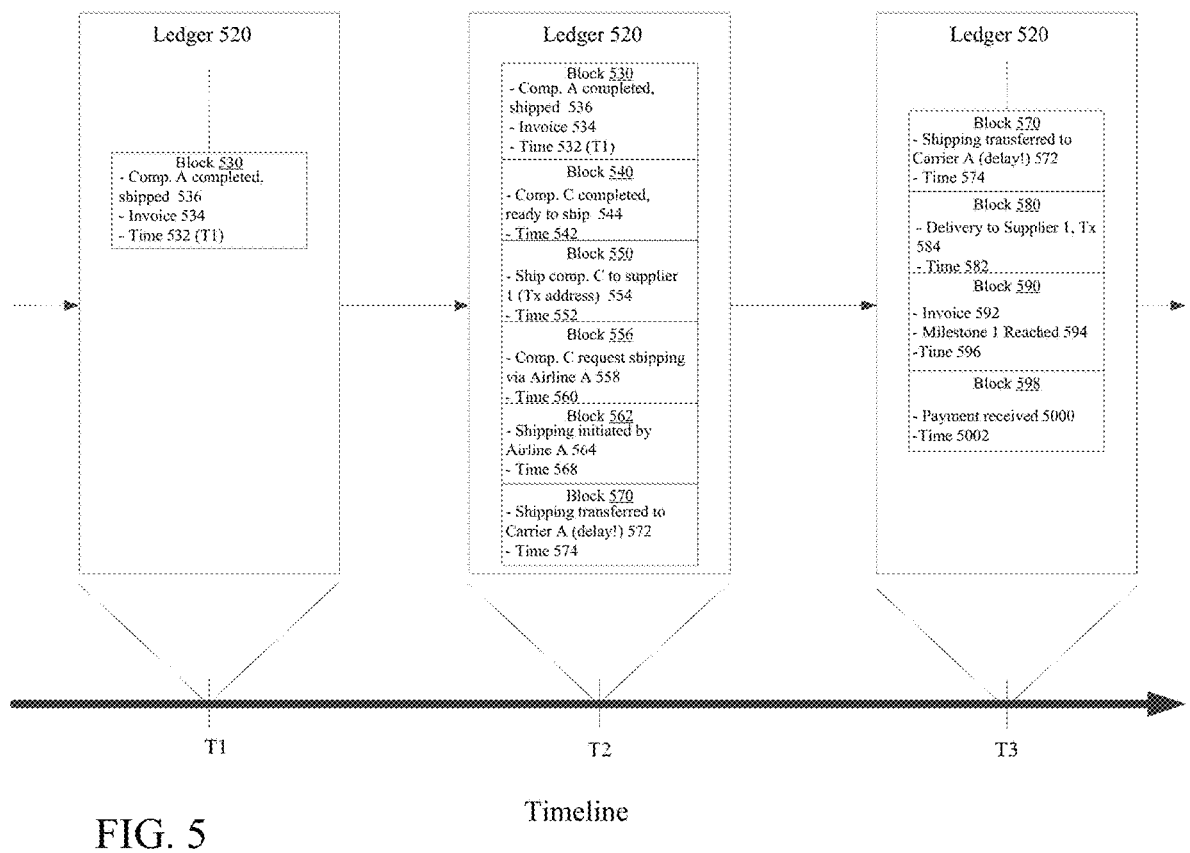
FIG. 5 shows a block diagram of an example implementation of a blockchain in accordance with some embodiments.

FIG. 4 shows a diagram of an example build and shipping process for a product in accordance with some embodiments, while FIG. 5 shows a block diagram of an example implementation of a blockchain showing block generation from FIG. 4's build and shipping process. A product may include multiple components that require inbound logistics dealing with the shipment of those components making up the product in a customer order. Supplier 1, for example, can start the partial build in one site, but determine that it needs to go to a different site in a different location (e.g., different country) to finish. Moreover, supplier 1 can determine that it also needs to receive a component from supplier 2 before shipping the finished product to the customer.

So, in this example, if the finished product includes components A, B, and C, Supplier 1 (402) can provide components A and B, but from different facilities. Specifically, a facility in China can provide component A, but component B can only be provided by a facility in Texas. Component C is to be provided by Supplier 2 (406). Thus, the final product needs to be built by coordinating between multiple suppliers with potentially multiple facilities across the world. Since supplier 1 (both facilities) and supplier 2 are enabled as nodes on the network, however, system 100 can handle this easily as described below.

Supplier 1 402 can determine or be notified by blockchain ledger 124 to manufacture components A and B Similarly, supplier 2 406 can determine or be notified by blockchain ledger 124 to manufacture component C. However, since supplier 1 402 has two different facilities, supplier 1 402 will need to coordinate between its facilities as well as supplier 2 406 to complete the final product. Thus, once supplier 1 (China) completes component A, supplier 1 (China) can notify its other facility in Texas that component A has been shipped to it (404). This notification can be added to blockchain 520 at time T1 shown in FIG. 5, which illustrates blockchain 520 at multiple times within the supply chain process.

Blockchain 520 is illustrated at times T1, T2, and T3, which are separated by time intervals controlled by system 100. For example, blockchain 520 includes a first block (block 530) at time T1, with block 580 appended to blockchain 520 at T2, and block 598 appended to blockchain 520 at T3.

Each block can be appended at any time there is a step or event in the product's manufacturing, processing, and/or distribution timeline. Each block can also contain multiple transactions from multiple suppliers and/or partners. Thus, block 530 can be appended to ledger 520 once or after component A has been manufactured and shipped to supplier 1 402 in Texas. Block 530 can include decentralized status information 536 ("component A completed"), as well as the time 432 it was completed/added to ledger 520 and an invoice 534 for services rendered.

In some embodiments, suppliers and partners may exchange more or less steps on ledger 520. For example, once component C is completed by supplier 2 406, supplier can inform supplier 1 (Texas) 402 that it is ready to ship (408). This can be done by, for example, supplier 2 406 adding block 540 to ledger 420 that component C is completed and ready to be shipped (event 544). Supplier 1 (Texas) 402 can send shipment instructions 410 in block 550 at time 552 (e.g., through providing an address 554 or other shipping information).

Once block 550 is added to ledger 520, supplier 2 406 can contact airline 412 and/or carrier 414, and inform ledger 520 of the shipping request 558 at block 556 at time 560. Airline 412 or supplier 2 406 can inform ledger 520 that shipping has been initiated (564) at time 568. Any updates can be added to ledger 520 on a real time or near real time basis as decentralized status information, such as for a transfer in carriers (block 570), delivery of the product (block 580), delays in shipment due to weather, time delays, etc. These updates/decentralized status information can be accessed such that the customer or any other node on the network is notified of the updates.

Milestones and automatic payments for milestones reached (416) can be executed by smart contracts and added to ledger 520 as well. Block 590 can include a generated invoice 592 when a milestone has been reached (594) at time 596 (e.g., when a component has been completed and shipped, which completes a condition of a smart contract that triggers creation of an invoice/payment). Block 598 can include that a payment was received (5000) at time 5002.

Figure 6:
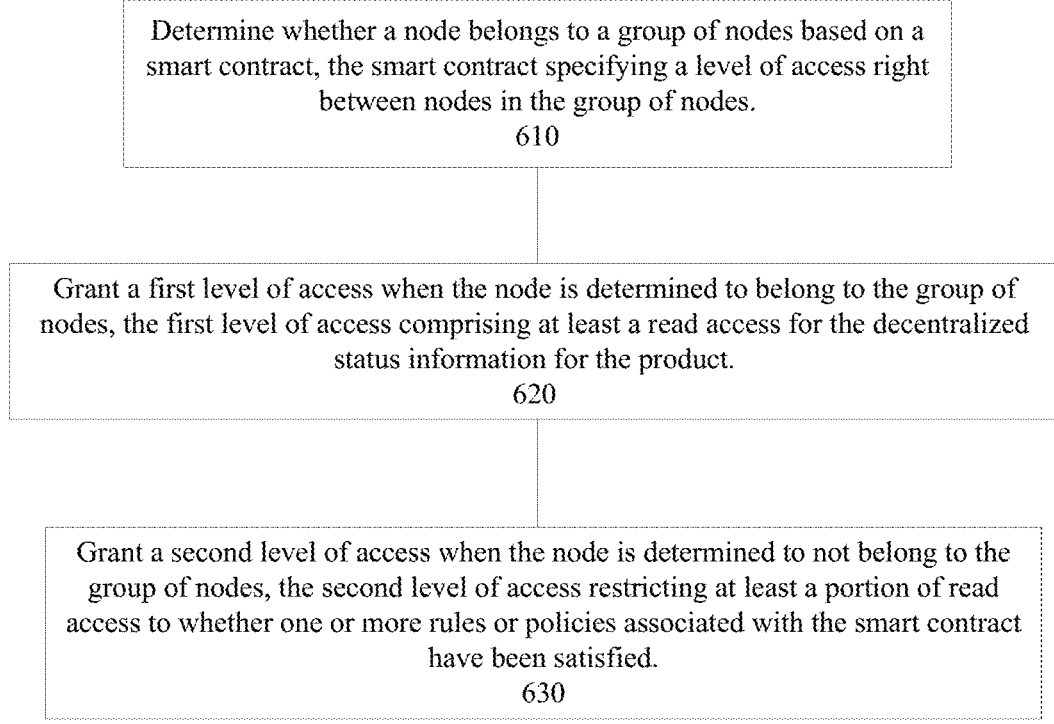
FIG. 6 is a flowchart representation of providing access permissions in a blockchain environment in accordance with some embodiments.

FIG. 6 is a flowchart representation of providing access permissions in a blockchain environment in accordance with some embodiments. The method can start by determining whether a node belongs to a group of nodes based on a smart contract (step 610). The smart contract can specify a level of access right between nodes in the group of nodes (step 610).

A first level of access right can be granted when the node is determined to belong to the group of nodes, where the first level of access includes at least a read access for the decentralized status information for the product (step 620). A second level of access can be granted when the node is determined to not belong to the group of nodes, where the second level of access can restrict at least a portion of read access in accordance with whether one or more rules or policies associated with the smart contract have been satisfied (step 630). For example, all nodes that belong to a certain group of nodes can read and/or write to the blockchain, while all nodes outside can only read a certain portion of the blockchain that pertains to the group of nodes.

Figure 7:
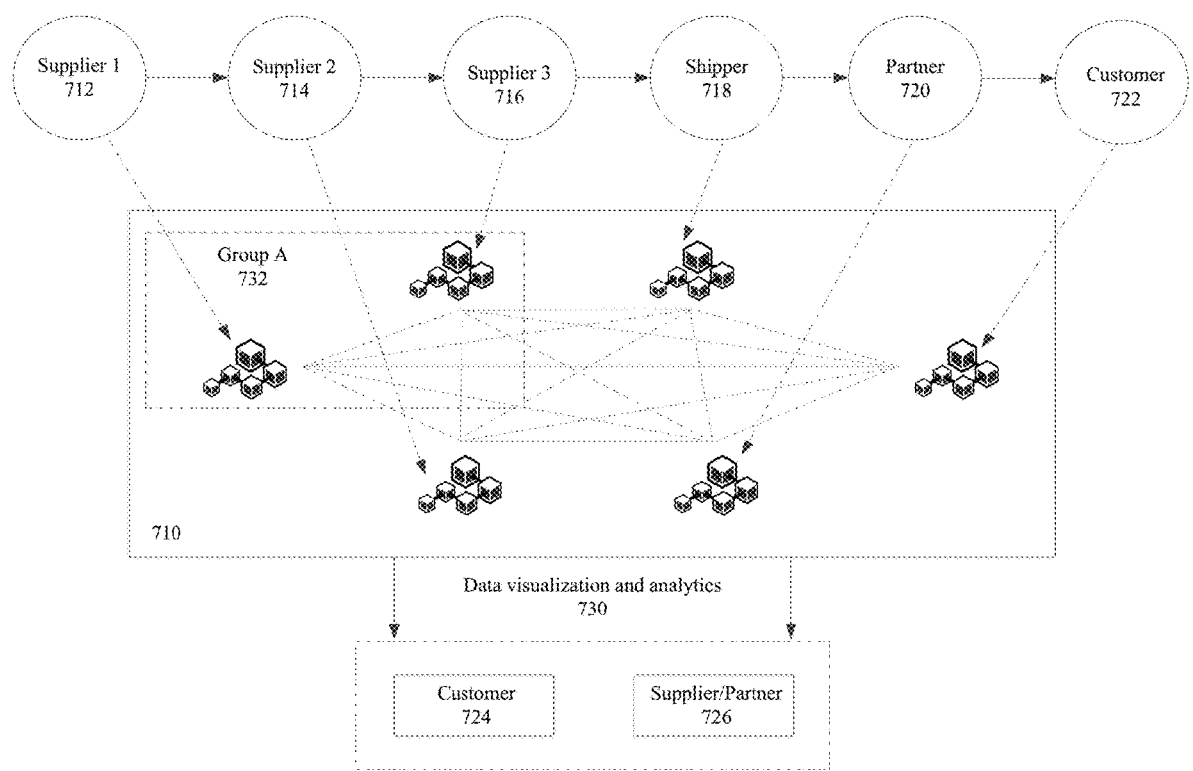
FIG. 7 shows an example schematic diagram of a blockchain network that provides data visualization and analytics in accordance with some embodiments.

FIG. 7 shows an example schematic diagram of a blockchain network that provides data visualization and analytics in accordance with some embodiments, including access permissions discussed with respect to FIG. 6. FIG. 7 shows an example embodiment where a customer has ordered a product that needs to be built. All the parties involved in the procurement, build, logistics, and/or even the customer are all enabled as nodes (712, 714, 716, 718, 720, 722) within system 710. In addition to configuring each node to connect to system 710, a predictive analytic algorithm can be added to the node. The predictive tool helps with the computation of data related to the site and its relationship to other site nodes involved in the transaction. For example, the predictive tool is able to understand the relationship between the inventory of the site and the request to build a product coming from a different node. The predictive tool is itself connected to system 710 and can receive business rules and policies from an orchestration engine (not shown) that is connected to the ordering tool and helps with dispatching of the tasks that each site has to execute.

In each block of data in the ledgers within system 710, an overhead data stream can be inserted. The overhead data can be a set of information that when read by the tool triggers particular predictive tasks.

In these instances, system 710 can monitor any transaction involved in dealing with the product. Since each node is equipped with a form of intelligence, that allows it to not only execute different tasks, but also have the awareness of other sites' intelligence to compute many tasks that usually are done in a traditional architecture (by huge amounts of resources, tools, and the exchange of many types of information). For example, when customer interface 724 accesses an ordering tool on their client device, customer interface 724 can get, through the distributed analytics and data visualization 730 on each node, a quick view of, for example, how long it will take to build a product and be provided the delivery date with a high confidence level. Also, this translates the order into a bill of material and which site/node does what, and then pushes them to system 710 that advertise through the rules and policies of the smart contract what each node can see and execute.

Once the order is placed, all the nodes get a copy of what they need to produce, and each node reports the status in real time in supplier/partner interface 726 on each supplier or partner node (e.g., nodes 712, 714, 716, 718, and/or 720). Once the build starts, the customer is given access to monitor the progress (e.g. through customer interface 724 on node 722).

In some embodiment, a consensus of the nodes within system 710 (e.g., whether half or more of the nodes on system 710 agree the transaction is valid) can verify if what was done by a site is valid or not. Also through the smart contracts, each site gets paid as soon as the tasks are done.

Moreover, system 710 can have sophisticated interplays between inbound shipments (shipments between different facilities at the same supplier) and outbound shipments (between different suppliers), which can track which components are ready for shipment or build, and where they are. For example, as components are shipped between certain facilities and suppliers, the RFID of the components can be scanned (and perhaps additional attributes input through manual inspection or other means) to make sure the right components are being shipped where they need to be and at the right time. For example, since system 710 knows which suppliers are involved in building the product, it can flag suppliers for follow up. Moreover, rules and policies specified within smart contracts can automatically and scalably prescribe what steps need to be taken between the suppliers/shippers, and can automatically complete transaction payments as the steps are completed as well as informing the customer of the product's build status.

As a result of this information, system 710 can apply predictive analytics to predict when customer interface 724 can expect to receive a completed product, can take unexpected delays and/or component shortages into account, and in some cases can dynamically specify which suppliers are most cost effective for building the product. For example, system 710 can sample contextual data on any of the nodes to determine whether a component of a product will be in short supply (e.g., through data tracked by the node, data provided by a third party, etc.). If there will be a component shortage which will affect certain nodes, system 710 can take prescriptive action by ensuring that those nodes will not be used for the build of the product or will predict, based on the contextual data, how long the product build will be delayed. Moreover, customer interface 724 can in some embodiments specify the nodes, based on information on the blockchain ledger, that they want to be part of the build process in order to maximize short turn around, minimize costs, redirect build/shipping to certain localities, etc. In other embodiments, this can be an automated process and different options can be presented to the customer to choose from.

System 710 can also determine that there will be a delay in build completion of the product based on decentralized status information received from one or more nodes on system 710, and provide a notification of the delay for display to the user on customer interface 724. The delay can be determined based on a shortage of one or more specific components of the product reported by one or more nodes on system 710 (either manually or through a third party service).

The blockchain can also have variable levels of security. The level of detail that can be included in the blockchain of system 710 can be, for example, made completely public or can have differing levels of access rights among the customer, the nodes, and/or both. For example, access rights may be restricted to a certain number of nodes, such as the group of nodes that make up a certain supplier (e.g., group 732 including supplier 1 712 and 716), but may be restricted partially or entirely from other nodes (e.g., nodes belonging to competing suppliers that shouldn't be able to have any access rights to the first supplier's data, such as supplier 2 714). In the case of competing suppliers having smart contracts between themselves, the blockchain platform may only let the suppliers know if the rules and/or policies have been satisfied, allowing transactional payments to go through while minimizing the share of data. Additionally, a predictive service (e.g., such as predictive service 130 in FIG. 1), can inform about delays, shortages, etc. based on contextual data, which can be used in conjunction with smart contracts to make the smart contracts more flexible (e.g., a smart contract may allow an additional 7 days for a condition to be satisfied, with perhaps lower payment or another condition, instead of taking action for total breach).

A shipping process can also be included in a blockchain for partial or complete read access by a customer. When a customer is in the process of selecting an order for a product, for example, the customer can be granted access to the product's associated suppliers and build information on the blockchain. For example, the build information can describe when the build is going to happen, what's in current inventory (the quantity, location, and planned shipments for components of the product), and/or when a completed product is expected to be shipped and/or received by the customer. As the customer views the product(s) to order, for example, the system can look into the build material to know what's available or what's not currently available in inventory. With this information, the blockchain can tell a customer that they would receive this product in a certain amount of time within a certain confidence, e.g., since the product is in inventory, there is a 90% chance of delivery within 25 days.

In some embodiments, customer interface 724 can include an option to order the product, where the option enables system 710 to automatically generate a set of tasks between nodes to build the product. Each of the nodes automatically execute a rule or policy in accordance with a smart contract if one applies, and can moreover dynamically determine which suppliers are most cost effective for building the product. Those suppliers who are most cost effective can be provided for display to the user on customer interface 724.

Figure 8:
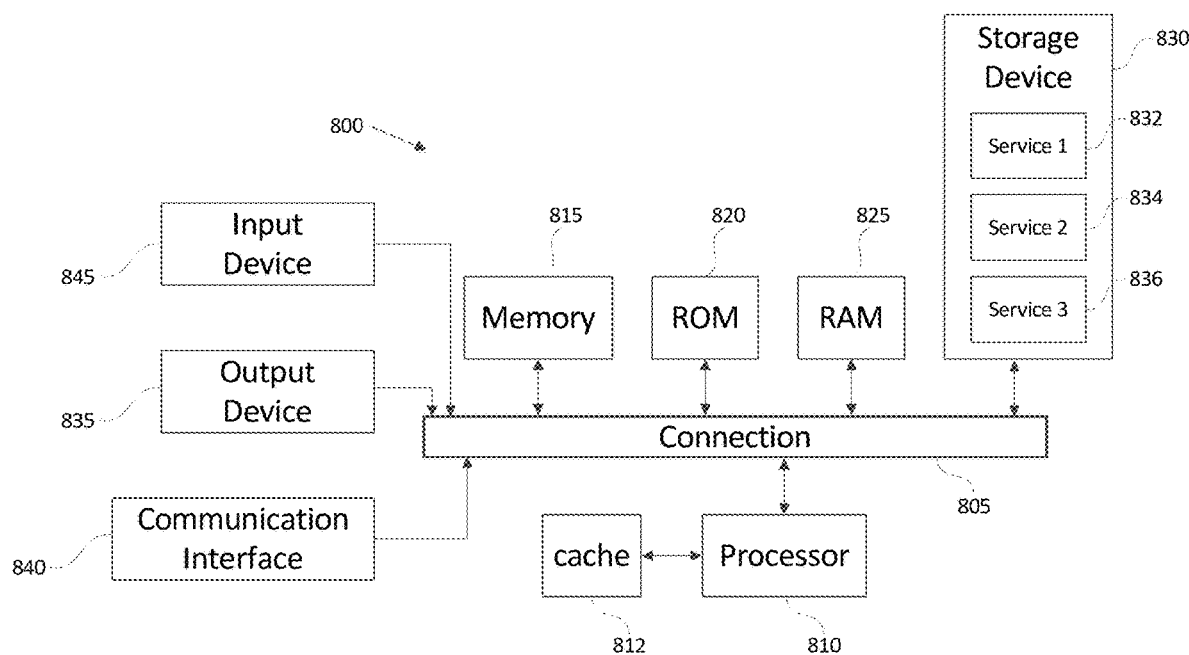
FIG. 8 shows an example of a system for implementing certain aspects of the present technology.

FIG. 8 shows an example of computing system 800 for use in components illustrated in FIGS. 1, 3, 4, 5, and 7, in which the components of the system are in communication with each other using connection 805. Connection 805 can be a virtual connection, networked connection, or logical connection within a server environment or a cloud environment. Connection 805 can also be a physical connection via a bus, or a direct connection into processor 810, such as in a chipset architecture.

In some embodiments computing system 800 can be a distributed system in which the functions described in this disclosure can be distributed within a cloud, datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving a request from a user to view decentralized status information for a product;
receiving, from one or more nodes in a blockchain ledger on a distributed network, the decentralized status information for the product, wherein the one or more nodes are one or more of suppliers or partners in a supply distribution chain of the product; and
granting at least read access to the decentralized status information of the product to the user and a prediction of product build completion that is determined based on node supply chain relationships specified within a smart contract for the blockchain ledger and contextual data related to operation of the one or more nodes in the supply distribution chain of the product, wherein:
the read access to the decentralized status information for the user is granted based on one or more restrictions in the smart contract specifying whether to grant at least one of no access to all or a portion of the decentralized status information, read access to all or the portion of the decentralized status information, and write access to all or the portion of the decentralized status information;
the decentralized status information is obtained through the blockchain ledger and comprises real time updates for one or more of building the product, assembling the product, shipping the product, or exchanging payments between the one or more of suppliers or partners.

2. The method of claim 1, wherein the request from the user further comprises an option to order the product, the option enabling the distributed network to automatically generate a set of tasks between the one or more nodes to build the product.

3. The method of claim 1, wherein each of the one or more nodes are configured to automatically execute a rule or policy in accordance with the smart contract.

4. The method of claim 1, the method further comprising:
determining whether a node belongs to a group of nodes based on a smart contract, the smart contract specifying a level of access right between nodes in the group of nodes;
granting a first level of access when the node is determined to belong to the group of nodes, the first level of access comprising at least a read access for the decentralized status information for the product; and
granting a second level of access when the node is determined to not belong to the group of nodes, the second level of access restricting at least a portion of read access to whether one or more rules or policies associated with the smart contract have been satisfied.

5. The method of claim 1, the method further comprising:
determining that there will be a delay in build completion of the product based on the decentralized status information received from the one or more nodes; and
providing a notification of the delay for display to the user.

6. The method of claim 5, wherein the delay is determined based on a shortage of one or more specific components of the product reported by the one or more nodes.

7. The method of claim 1, the method further comprising:
dynamically determining which suppliers are most cost effective for building the product; and
providing the suppliers who are most cost effective for display to the user.

8. A distributed server system of providing real time updates in a supply distribution chain, the distributed server system comprising:
one or more nodes on a distributed network;
a communication interface of a first node that communicates over a communication network with the one or more nodes on the distributed network, wherein the communication interface:
receives a request from a user to view decentralized status information for a product;
receives, from the one or more nodes in a blockchain ledger on the distributed network, the decentralized status information for the product, wherein the one or more nodes are one or more of suppliers or partners in the supply distribution chain of the product; and
a processor of the first node that executes instructions stored in memory, wherein execution of the instructions by the processor:
grants at least read access to the decentralized status information of the product to the user and a prediction of product build completion that is determined based on node supply chain relationships specified within a smart contract for the blockchain ledger and contextual data related to operation of the one or more nodes in the supply distribution chain of the product, wherein:

the read access to the decentralized status information for the user is granted based on one or more restrictions in the smart contract specifying whether to grant at least one of no access to all or a portion of the decentralized status information, read access to all or the portion of the decentralized status information, and write access to all or the portion of the decentralized status information;
the decentralized status information comprises real time updates for one or more of building the product, assembling the product, shipping the product, or exchanging payments between the one or more of suppliers or partners.

9. The distributed server system of claim 8, wherein the request from the user comprises an option to order the product, the option enabling the distributed network to automatically generate a set of tasks between the one or more nodes to build the product.

10. The distributed server system of claim 8, wherein each of the one or more nodes are configured to automatically execute a rule or policy in accordance with the smart contract.

11. The distributed server system of claim 8, wherein execution of the instructions by the processor further:
determines whether a node belongs to a group of nodes based on a smart contract, the smart contract specifying a level of access right between nodes in the group of nodes;
grants a first level of access when the node is determined to belong to the group of nodes, the first level of access comprising at least a read access for the decentralized status information for the product; and
grants a second level of access when the node is determined to not belong to the group of nodes, the second level of access restricting at least a portion of read access to whether one or more rules or policies associated with the smart contract have been satisfied.

12. The distributed server system of claim 8, wherein execution of the instructions by the processor further:
determines that there will be a delay in build completion of the product based on the decentralized status information received from the one or more nodes; and
provides a notification of the delay for display to the user.

13. The distributed server system of claim 12, wherein the delay is determined based on a shortage of one or more specific components of the product reported by the one or more nodes.

14. The distributed server system of claim 8, wherein execution of the instructions by the processor further:
dynamically determines which suppliers are most cost effective for building the product; and
provides the suppliers who are most cost effective for display to the user.

15. A non-transitory computer-readable medium comprising instructions stored thereon, the instructions executable by one or more processors of a computing system to perform a method for providing real time updates in a supply distribution chain, the instructions causing the computing system to:
receive a request from a user to view decentralized status information for a product;
receive, from one or more nodes in a blockchain ledger on a distributed network, the decentralized status information for the product, wherein the one or more nodes are one or more of suppliers or partners in a supply distribution chain of the product; and grant at least read access to the decentralized status information of the product to the user and a prediction of product build completion that is determined based on node supply chain relationships specified within a smart contract for the blockchain ledger and contextual data related to operation of the one or more nodes in the supply distribution chain of the product, wherein:

the read access to the decentralized status information for the user is granted based on one or more restrictions in the smart contract specifying whether to grant at least one of no access to all or a portion of the decentralized status information, read access to all or the portion of the decentralized status information, and write access to all or the portion of the decentralized status information;

the decentralized status information comprises real time updates for one or more of building the product, assembling the product, shipping the product, or exchanging payments between the one or more of suppliers or partners.

16. The non-transitory computer-readable medium of claim 15, wherein the request from the user further comprises an option to order the product, the option enabling the distributed network to automatically generate a set of tasks between the one or more nodes to build the product.

17. The non-transitory computer-readable medium of claim 15, wherein each of the one or more nodes are configured to automatically execute a rule or policy in accordance with the smart contract.

18. The non-transitory computer-readable medium of claim 15, further comprising instructions executable to:
determine whether a node belongs to a group of nodes based on a smart contract, the smart contract specifying a level of access right between nodes in the group of nodes;
grant a first level of access when the node is determined to belong to the group of nodes, a first level of access comprising at least a read access for the decentralized status information for the product; and
grant a second level of access when the node is determined to not belong to the group of nodes, the second level of access restricting at least a portion of read access to whether one or more rules or policies associated with the smart contract have been satisfied.

19. The non-transitory computer-readable medium of claim 15, further comprising instructions executable to:
determine that there will be a delay in build completion of the product based on the decentralized status information received from the one or more nodes; and
provide a notification of the delay for display to the user.

20. The non-transitory computer-readable medium of claim 19, wherein the delay is determined based on a shortage of one or more specific components of the product reported by the one or more nodes.

* * * * *